Figure 1:
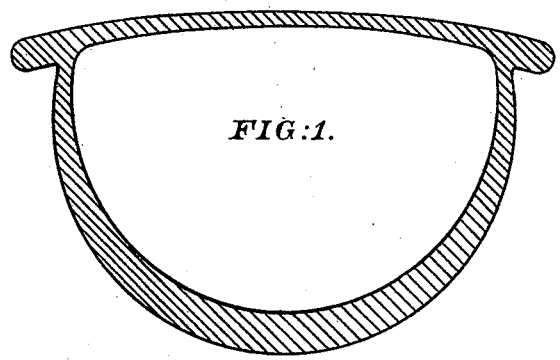

(No Model.) 5 Sheets—Sheet 1.

W. GOLDING.
RUBBER TIRE.

No. 493,160. Patented Mar. 7, 1893.

Witnesses.
George Baumann
John Revell

Inventor:
William Golding
By his Attys
Howson and Howson (No Model.) W. GOLDING. 5 Sheets—Sheet 2.
RUBBER TIRE.
No. 493,160. Patented Mar. 7, 1893.
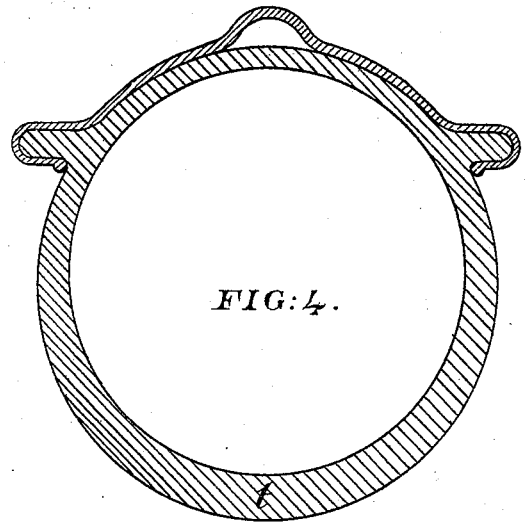
FIG: 4.
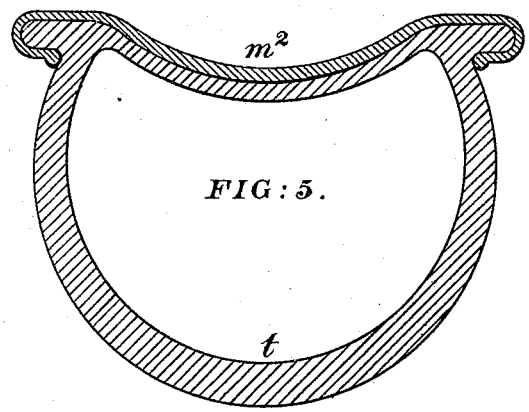
FIG: 5.
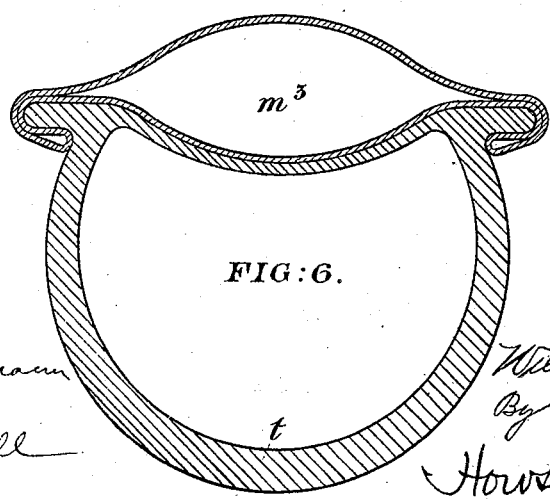
FIG: 6.
Witnesses.
George Baumann
John Revell
Inventor.
William Golding
By his Attys
Howson and Howson (No Model.) 5 Sheets—Sheet 3.
W. GOLDING.
RUBBER TIRE.
No. 493,160. Patented Mar. 7, 1893.
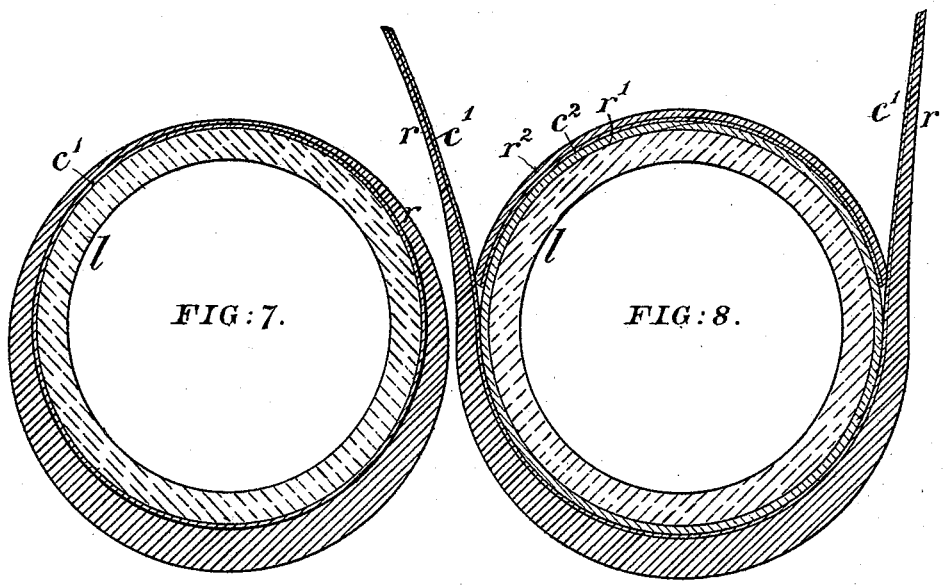
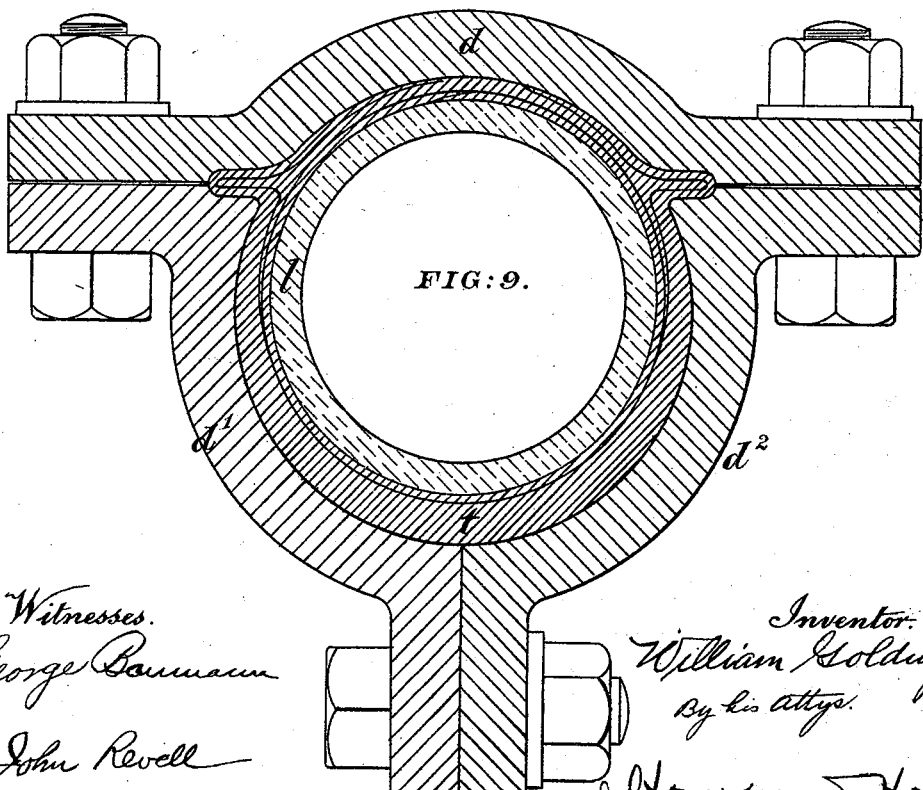
Witnesses.
George Baumann
John Revell
Inventor.
William Golding
By his attys.
Howson and Howson (No Model.) 5 Sheets—Sheet 4.
W. GOLDING.
RUBBER TIRE.
No. 493,160. Patented Mar. 7, 1893.
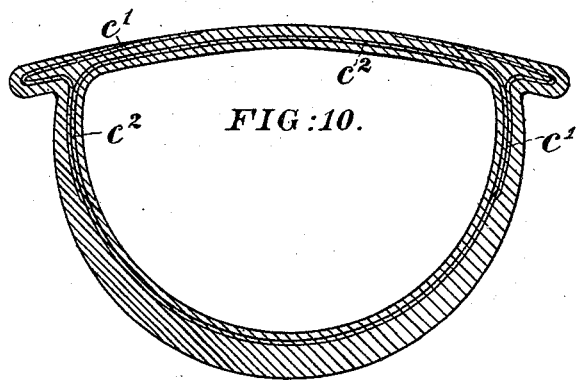
FIG:10.
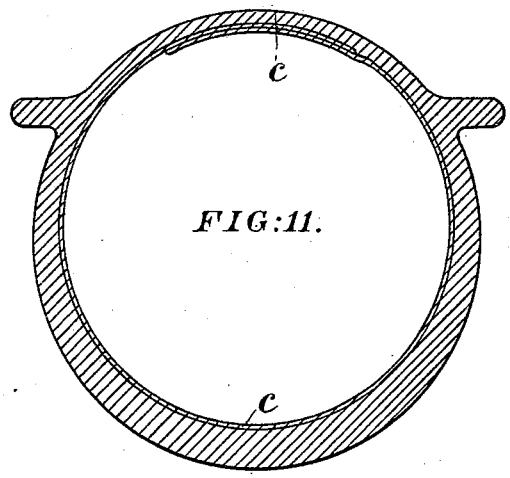
FIG:11.
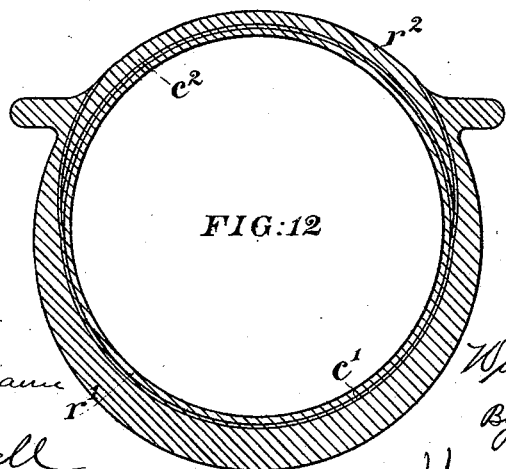
FIG:12

(No Model.) 5 Sheets—Sheet 5.
W. GOLDING.
RUBBER TIRE.
No. 493,160. Patented Mar. 7, 1893.
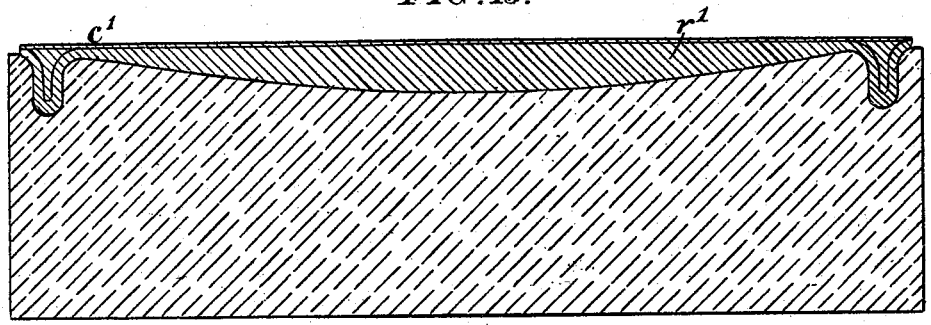
FIG: 13.
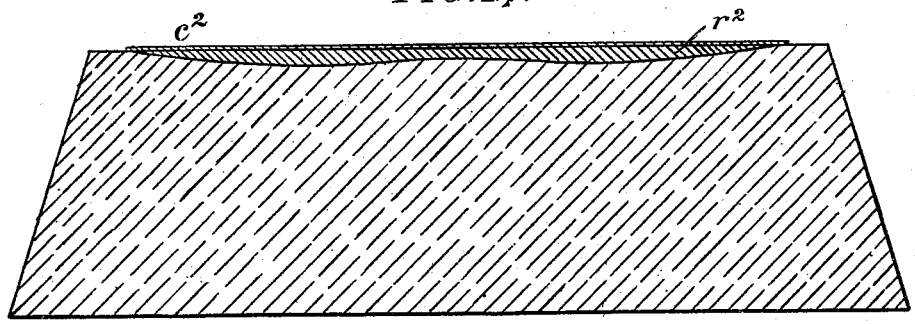
FIG: 14.
FIG: 16.
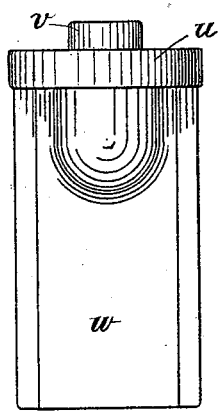
FIG: 15.
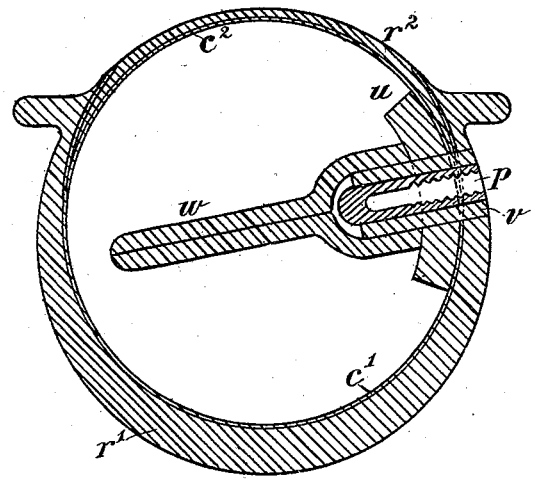
FIG: 17.
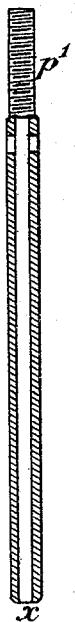
Witnesses.
George Baumann
John Revell
Inventor.
William Golding
By his Attys
Howson and Howson

UNITED STATES PATENT OFFICE.

WILLIAM GOLDING, OF MANCHESTER, ENGLAND, ASSIGNOR TO CHARLES MACINTOSH & CO., LIMITED, OF SAME PLACE.

RUBBER TIRE.

SPECIFICATION forming part of Letters Patent No. 493,160, dated March 7, 1893.

Application filed October 6, 1891. Serial No. 407,831. (No model.) Patented in England December 8, 1890, No. 19,990.

*To all whom it may concern:*

Be it known that I, WILLIAM GOLDING, a subject of the Queen of Great Britain and Ireland, residing at Moss Side, Manchester, in the county of Lancaster, England, have invented Improvements in Rubber Tires and Rims or Fellies for Velocipedes and other Light Carriages, (for which I have applied for a British patent, No. 19,990, dated December 8, 1890,) of which the following is a specification.

This invention relates to improvements in pneumatic rubber tires, and has for its object, simplicity and economy of production and the avoidance of certain defects existing in present compressed air tires.

In constructing this class of tire it is of importance that the bulk of the air reservoir should be outside the outermost edge of the rim of the wheel. When so constructed there is great difficulty in properly securing the tire to the rim. The only effective method up to the present for doing so is by fixing continuous bands of canvas to the tire and passing them over the rim, to which they are cemented, or the edges of the canvas bands are laced together. This method though successful in holding the tire and rim together in the proper position has serious defects. It is expensive and complicated requiring special apparatus for effecting it, and does not afford the tire sufficient lateral support. The consequence is that the tire is unstable laterally and causes the rider and machine to slip sidewise on wet or muddy roads.

The other method in use is to form the tire cylindrical in shape, with a cylindrical hollow through it longitudinally, in which is placed, at the time that the tire is molded, a cylindrical tube of canvas and rubber to withstand the stress of the air pressure. The tire is then cemented or otherwise fastened, in the usual semicircular or U shaped rim. The defects of this are, that the air reservoir is situated half or more than half within the outer edge of the rim so that, unless an undue pressure of air is used or the diameter of tire and rim are very large, the edge of the rim comes near the ground under the pressure of the weight of the rider and machine. It thus receives the shocks of obstacles instead of the tire; the latter is also pressed between the edge of the rim and the ground and is cut by it. The tire is also liable to be pulled out and cause accidents. Tires of large diameter are also difficult to put on without straining them, as the canvas has very little stretch and the tires being molded ring-shaped, they have necessarily to be stretched over the outer edges of the rim. According to this invention I shape or mold the tire so that it is approximately semicircular in outline in cross section, the semicircular curve forming the outer part of the ring of the completed tire and the flat part, represented by the diameter in section, forming the inner part of the ring. The tire is hollow, the hole being also approximately semicircular in cross section. It is either entirely lined, or lined inside round the semicircular curve, with canvas which is saturated with rubber in solution and amalgamated with the inside of the rubber tire. Along the opposite edges, forming in effect an extension of the diameter, a lateral projection or flange is shaped or molded with the tire.

Figure 2:
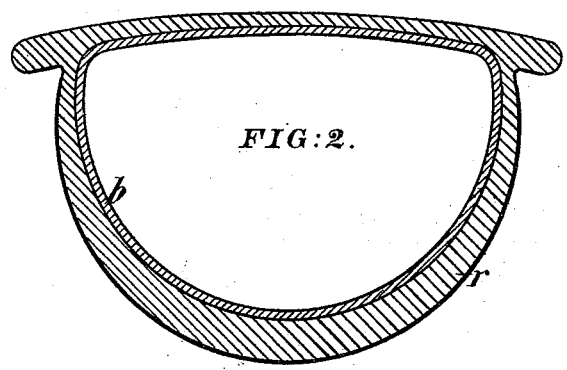
Figure 3:
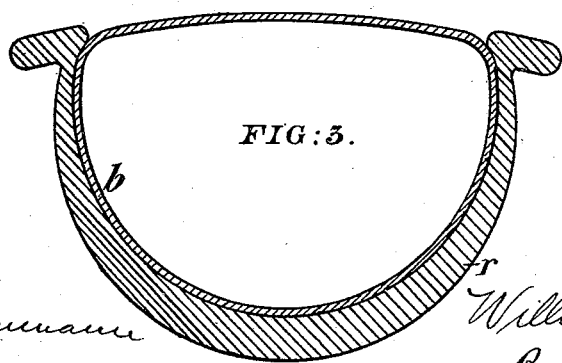

Figures 1, 2 and 3 represent cross sections of the tire. This is approximately the shape assumed in cross section when the tire is shaped upon a straight cylindrical mandrel and after vulcanizing joined endless.

On Sheet 1 of the drawings Fig. 1 represents in cross section a tire constructed so as to be airtight, without an interior tubular bladder. Fig. 2 represents a tire *r* such as just described but inclosing a separate interior tubular bladder *b;* and Fig. 3 represents such a tire *r* without the inner curved piece. On Sheet 2 of the drawings Figs. 4, 5 and 6 are sections showing the combination of my improved tires with three forms of steel rims or fellies. On Sheet 3 of the drawings, Figs. 7 and 8 are sections illustrating the method of constructing or building up my improved tire, and Fig. 9 is a section of the mold employed for vulcanizing the same. On Sheet 4 of the drawings, Fig. 10 illustrates the position of the canvas in the rubber walls, the outline being approximately the shape assumed by the tire when it has been joined up endless, and Figs. 11 and 12 show two alternative methods of arranging the canvas strips and effecting the junction of the rubber strips. On Sheet 5 of the drawings, Figs. 13 and 14, are sections of molds for forming the upper and lower halves of the flanged tube shown at Figs. 11 and 12. Fig. 15 is a cross section through the tire with inflating tube and valve. Fig. 16 is a front elevation of the latter, and Fig. 17 is a partial section of the instrument employed for allowing the escape of the compressed air when necessary.

Referring to Sheet 1 of the drawings Fig. 3 it will be seen that the inner curved piece or base of the tire is dispensed with, its place being taken by the inner curve of the interior tubular bladder $b$. The latter when employed with the outer curve and flanges of a tire or casing as shown in Fig. 3, may be solutioned to it, so that the two form practically a single tube. It is obvious that these flanges afford the means by which the tire may be secured to the rim in many different ways. The steel rim is shaped so that the outer part, where the rubber comes into contact with it, has approximately the same shape as the tire. That is, it is mainly flat in cross section, or it may be slightly concave, as shown in Fig. 4, or, by preference, convex, as shown in Fig. 5, the elasticity of the flat part of the rubber allowing it to accommodate itself to it. The edges of the rim are bent round and brought a short distance toward each other and nearly parallel to the flat surface of the rim, thus forming an inner recess or groove along the rim on both sides, suitable for holding the projecting flanges of the tire just previously described. The tire is made to fit the rim rather tightly, and is placed in position over it when uninflated. The tire is punched laterally from point to point until the flanges of the tire are sprung into the recesses of the rim. The tire is filled through the inlet pipe with compressed air by means of the usual air syringe. It is, as a result of the air pressure, so securely fixed in the rim that it cannot be pulled out by any fair means. The effect of the pressure is to narrow and thicken the flanges and drive them firmly into the recesses of the rim, and the sides of the latter being at right angles to the direction of the strains upon the side walls of the tire, caused by side wrenches and shocks, the lateral position of flanges and recesses as described and illustrated is the best position for resisting them.

To construct the tire as hereinbefore described, a strip of rubber is built up of crescent shape in cross outline with a lining of rubber solutioned canvas preferably cut on the bias or cross. These are shown at $r$, $r$, and $c'$, $c'$, respectively in Figs. 7 and 8. A strip of sheet rubber $r^2$ Fig. 8 is joined to a solutioned strip of canvas preferably cut on the straight, that is the edges will run parallel with the warp or with the weft threads; this is indicated at $c^2$. The crescent shaped piece $r$ is placed on a mandrel, shown in cross section at $l$, Fig. 7, and rolled in the usual way. The tire is built up in the following way. When it is intended to form an air tight compartment to hold the compressed air without a separate interior air bladder, a strip of sheet rubber is first wrapped round a mandrel and the edges joined as shown in Fig. 8 at $r'$. The strip $r^2 c^2$ is placed over it on the mandrel. The crescent shaped strip $r c'$ is removed from the other mandrel, and placed round the part of the inner strip $r^2$ left uncovered, the ends being loose as shown. The mandrel with the strips upon it is then placed in one of the sides of a three part mold represented in cross section at $d'$, $d^2$, and $d^3$, Fig. 9. One of the loose ends of the strip $r c'$, is folded over into the recess of the mold in order to form the flange, the thinner edge being smoothly pressed down upon the strip $r^2 c^2$. The other side of the mold is screwed to the first and the opposite flange formed in the same way. The top of the mold $d^3$ is screwed on and the rubber tube vulcanized in the position shown in Fig. 9. The lines in the section show the junction of the different strips of rubber, though these are not visible after vulcanizing. In some cases I may pack the flanges of the tire within the lap, with strips of hard rubber compound, or with stout canvas, leather, or metal. When the tire is intended to contain a separate interior bladder tube, the inner skin of rubber $r'$ may be left out. The tire is joined endless after vulcanizing, by solutioning the half of a short thin tube of rubber and canvas into one end of the tube, the edges of the latter having been first beveled off at both ends. When this is dry, the projecting half is well coated on the outside, as are also the beveled edges of the tube, with rubber solution in a thin or liquid state, the opposite edges are brought together, and the projecting half of the thin tube is inserted in the other end of the tube. They are firmly held together by being inserted in a short straight mold similar in cross section to that shown in Fig. 9. The tire is then pumped hard with compressed air and left in that position till the solution is thoroughly set. Fig. 10 represents the cross section of a tire so constructed (not shown through the join) the parallel curved lines shown at $c'$, $c^2$ indicates the position of the canvas strips inside the rubber wall.

The second head relates to an improved method, or improved processes, for manufacturing such a flanged tire as previously herein described. The rubber strip composing the crescent shaped, in cross section, outer curve of the tire with the lateral flanges, is molded into a closed circle or ring of the required diameter. It is first molded into a shape semi-circular or U shaped in cross section with lateral flanges projecting outward. A strip of canvas saturated with rubber and of a width sufficient to reach from the edge of one flange round the interior of the rubber and to the edge of the opposite flange is rolled under pressure into the surface of the rubber preferably by placing the rubber and canvas strip flat into a mold formed by an ingot dished out to the required shape as shown in Fig. 13, and it is then rolled flat under pressure. The edges are then beveled off and joined endless. The junction strip $r^2$ $c^2$ is either a flat strip as previously described or it is molded by rolling in the same way as indicated in Fig. 14. These two strips are then joined together over a mandrel, either with an interior skin of rubber as shown in Fig. 12 or without as shown in Fig. 15, the parts being securely welded together at the flanges by pressure, the junction surfaces having been first coated with solution. Fig. 11 represents the junction line as longitudinally along the center of the flanges, with a lining of canvas first folded over the mandrel. The tubular ring thus completed is vulcanized in one piece in a ring shaped mold.

The third head relates to an improved valve and inlet pipe. It has been found in practice that non-return valves acting with interior plugs, metal flaps or any loose or fixed metal parts are apt to be damaged by contact with road obstacles, and allow the compressed air to escape more or less. The object of this head of my invention is an easily constructed and light inlet pipe which shall itself act as a non-return valve and be effective under all conditions. The whole of the inlet pipe and valve are made of rubber. Reference is made to Figs. 15 and 16. Fig. 16 represents a front elevation of inlet pipe and valve and in Fig. 15 a cross section is shown in position attached to the wall of the tire. The outer part of the pipe $v$ is cylindrical with a round disk or washer $u$ fast upon it near one end. Two short pieces of thin rubber $w$, $w'$ are joined together flat at the two opposite edges and so vulcanized under pressure, a piece of thin smooth paper being inserted between the lips to prevent them sticking together. One end of this is passed over the cylindrical pipe and securely joined to it and to the rubber washer before vulcanizing. The end of the pipe is passed through a hole in the side of the tire, clear of the rim, the outer edge of the pipe being flush with the outer surface of the rubber. The inlet pipe with valve is separately vulcanized and inserted through the wall of the tire and solutioned in place therein before the tire is joined endless. When the air is injected into the tire the rubber lips open and allow the air ingress. Immediately the rush of air is past the rubber lips close and are firmly held together by the air pressure in the interior of the tire.

The fourth head of my invention relates to an improved plug and means for fixing in and withdrawing the same from the orifice of the inlet pipe. The object of this is to keep out dirt and to prevent the escape of any air which may filter through the valve. This plug is shown in cross section at $p$ Fig. 15. It is a cylindrical piece of metal or other suitable material having one end semi-circular or conical. The other end has a hole drilled in it and is tapped. The circumference of the plug is larger than the interior bore of the inlet pipe. It is pressed or forced into the latter so that by compressing the rubber all round it no air can pass. The conical end nearly touches the lips of the valve so as to leave no space for any air which may pass the valve to accumulate sufficient force to dislodge it. It is inserted by being screwed somewhat loosely on the end of a pin $p'$ shown partly in section in Fig. 17, and upon the pin being unscrewed and withdrawn, the plug is left in the pipe. It is withdrawn in a similar manner. The other end of the pin is tubular at $x$ with a cross hole drilled through at the inner end of the tubular part. When it is required to relieve the pressure of air in the tire or to let out all the compressed air, the plug is withdrawn and the tubular end of the bar inserted through the rubber lips of the valve.

The fifth head of this invention relates to an improved hollow rim, for holding the tire already described, which is very light, strong, and rigid and adapted to resist buckling strains (see Fig. 6). Its outline in cross section is approximately elliptical, with two flanges bent laterally inward forming two grooves or recesses, one on each side, adapted to hold the two flanges of the rubber tire. It may be made of a strip of thin sheet steel rolled into shape in the usual way, with the overlapping edges brazed together or it may be rolled out of two strips forming in effect two rims, one inserted in the other and brazed together at the flanges, or it may be made without any longitudinal join by rolling it out of a weldless steel tube.

I claim as my invention—

1. The combination with a metallic wheel rim having lateral recesses formed by reflexing the edges, of an inflatable tire having corresponding lateral flanges which are detachably inserted into such recesses, and are secured therein by the pressure of the contained compressed air when the tire is inflated substantially as hereinbefore set forth.

2. The herein described method or series of processes for constructing or building up the said inflatable tire with lateral projections or flanges upon it, first by shaping the tire on the mandrel, secondly by folding down the sides or edges, and thirdly by tightly inclosing both mandrel and tire within a three part mold during vulcanization, substantially as set forth.

3. The combination of a pneumatic tire having an outer elastic casing with flanges and an inner inflatable tube, with a hollow metal rim of a wheel approximately elliptical in cross section and with two lateral recesses in which the flanges of the outer casing are inserted and held, substantially as hereinbefore set forth.

In testimony whereof I have signed my name to this specification in the presence of two subscribing witnesses.

WM. GOLDING.

Witnesses:
GEORGE DAVIES,
CHARLES A. DAVIES.